United States Patent [19]

Maxey

[11] 3,841,774
[45] Oct. 15, 1974

[54] EXPANDABLE SHAFT KEY
[75] Inventor: Joel W. Maxey, Detroit, Mich.
[73] Assignee: Ford Motor Company, Dearborn, Mich.
[22] Filed: Dec. 5, 1972
[21] Appl. No.: 312,420

[52] U.S. Cl................. 403/358, 403/47, 403/370
[51] Int. Cl.............................................. F16d 1/06
[58] Field of Search............ 403/47, 355, 356, 358, 403/365, 367, 368, 370, 371

[56] References Cited
UNITED STATES PATENTS

| | | | |
|---|---|---|---|
| 1,612,769 | 12/1926 | O'Connell | 403/370 X |
| 2,547,789 | 4/1951 | Skeel | 403/47 X |
| 2,691,541 | 10/1954 | Benedek | 403/370 |
| 2,994,548 | 8/1961 | McGogy | 403/356 |
| 3,378,285 | 4/1968 | Staley | 403/358 |
| 3,528,691 | 9/1970 | Matich, Jr. | 403/356 |

*Primary Examiner*—Werner H. Schroeder
*Attorney, Agent, or Firm*—Keith L. Zerschling; Clifford L. Sadler

[57] ABSTRACT

This disclosure relates to an expandable shaft key for securing the hub of a gear or pulley to a shaft such as the shaft of a motor. According to one embodiment of the invention, an expandable key includes first and second key parts that slidably engage each other along sloping surfaces. Each of the key parts has a threaded bore. A threaded rod constitutes an intermediate member interposed between the first and second key parts. The threaded intermediate member has coarse screw threads where it engages the bore of the first key part and fine screw threads where it engages the bore of the second key part. Upon rotation of the threaded intermediate member, the pitch differential between the fine and coarse threads causes the first and second key parts to be drawn together, whereby the inclination of the sloping surfaces will cause the key assembly to expand in a radial direction. The axes of the two bores are radially displaced as the two key parts are drawn together and the ends of the threaded intermediate member are thereby forced into misalignment. The deformation of the intermediate member produces a force that resists the accidental disassembly of the key parts which might otherwise result from normal machinery vibration.

6 Claims, 5 Drawing Figures

PATENTED OCT 15 1974  3,841,774
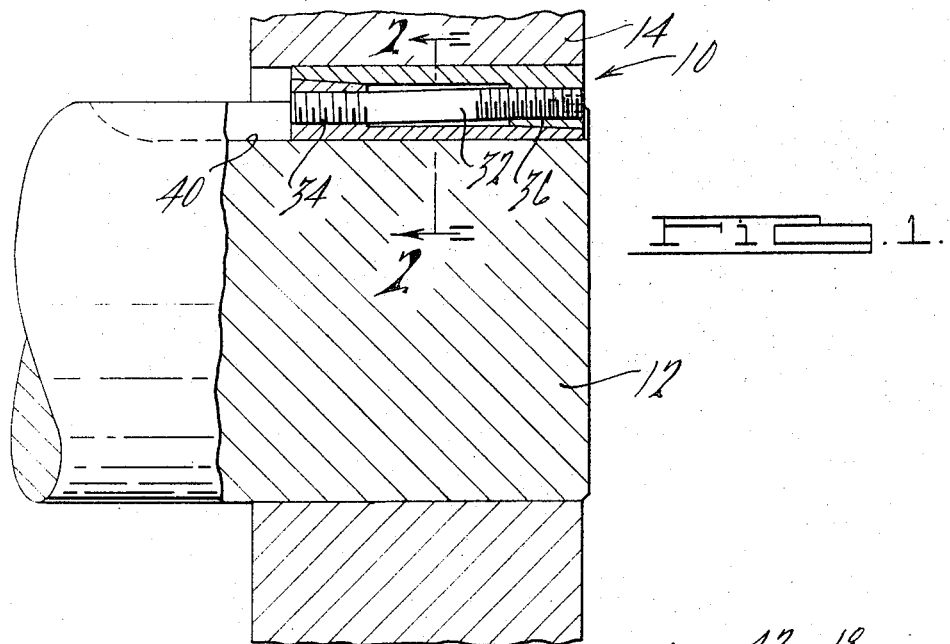
FIG. 1.
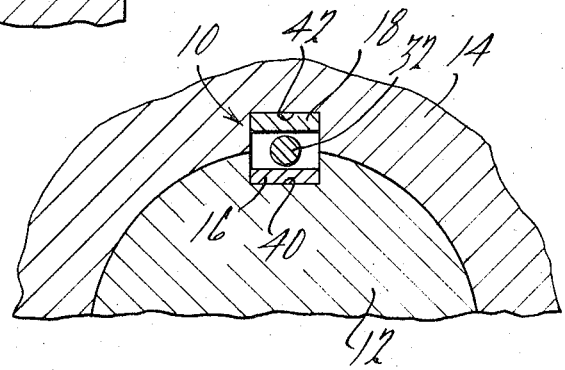
FIG. 2.
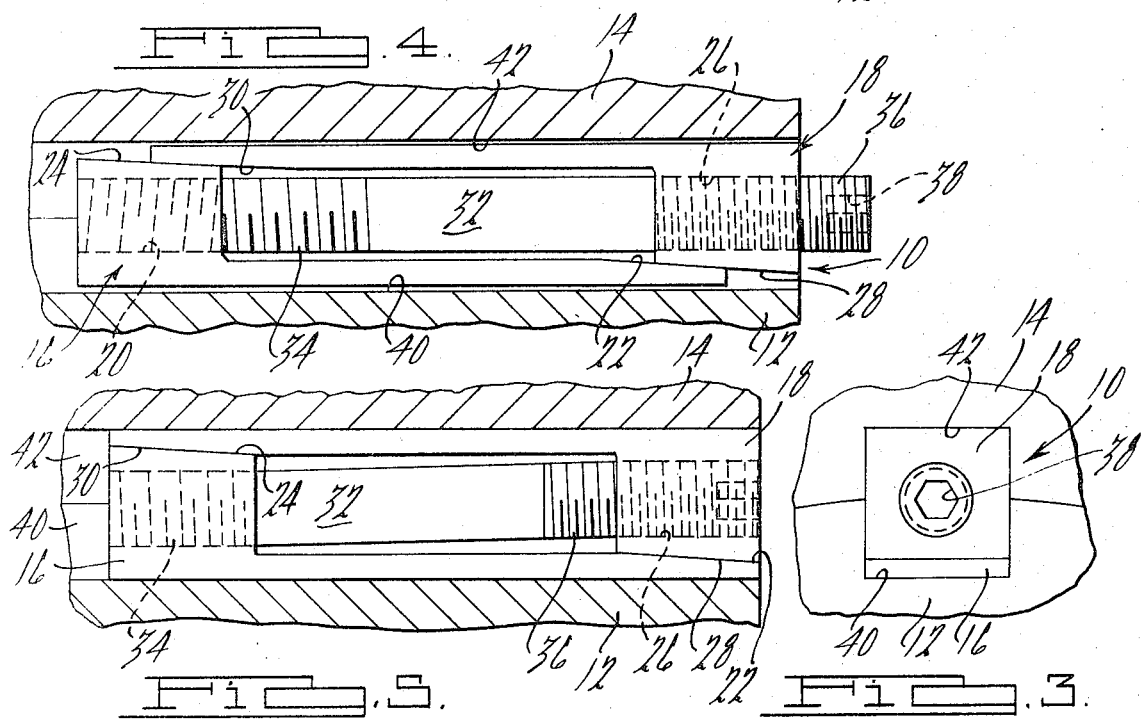
FIG. 4.
FIG. 5.  FIG. 3.

EXPANDABLE SHAFT KEY

BACKGROUND OF THE DISCLOSURE

The present invention relates to shaft keys for connecting pulleys or gears to a shaft such as a motor shaft. More particularly, the present invention relates to an expandable shaft key having a self-locking feature. The customary means in prior art constructions for securing a gear or pulley to a shaft is to provide a square cut keyway in the motor shaft and a matching keyway in the hub of the pulley. The pulley is positioned on the shaft with the two keyways in alignment. A square section solid key is inserted in the aligned keyways to make the pulley rotationally fast with respect to the shaft. A set screw that extends radially inwardly through the hub of the pulley is tightened to secure the solid key in position.

In accordance with the present invention, a simplified construction is provided which eliminates the threaded radial hole in the pulley that accommodates the set screw. An embodiment of this invention provides a shaft key that may be locked in the aligned keyways from the axial end of the hub. In some applications, the end of the key may be more accessible than a radial set screw.

BRIEF SUMMARY OF THE DISCLOSURE

In accordance with the presently preferred embodiment of this invention, a self-locking expandable shaft key is provided. The expandable key comprises first and second key parts and an interconnecting threaded part. The first key part has a pair of sloping surfaces and an axial bore that is threaded with a coarse screw thread. The second key part also has a pair of sloping surfaces that are constructed to slidably engage the sloping surfaces of the first key part. The second key part has an axial bore that is tapped with a fine screw thread.

The intermediate member has a shaft-like construction with a coarse screw thread at one end to engage the bore of the first key part and a fine screw thread at the other end to engage the bore of the second key part.

In the assembled condition, the first and second key parts have their sloping surfaces in slidable engagement. The intermediate shaft has its coarse-threaded end engaging the first key part and its fine-threaded end engaging the second key part.

In operation, a shaft has a square cut keyway and the hub of a pulley has a matching square keyway. The pulley is positioned on the shaft with the two keyways in alignment. The expandable shaft key is inserted axially into the opening defined by the two keyways. The threaded intermediate member is then rotated and the differential in pitch of the threads at the two ends of the intermediate member causes the first and second key parts to move axially toward each other. Due to the slope of the mating surfaces, axial displacement of the key parts causes proportionate radial displacement of the parts until the assembly locks the hub of the pulley to the shaft. When the first and second key parts move radially, the ends of the intermediate threaded member are bent and this deformation produces a self-locking feature. The deformation of the intermediate member produces a force that resists the accidental disassembly of the key part which might otherwise result from normal machinery vibration.

BRIEF DESCRIPTION OF THE DRAWINGS

The many objects and advantages of an expandable shaft key constructed in accordance with this invention will become apparent upon consideration of the following detailed description and the accompanying drawings, in which:

FIG. 1 is a side elevational view of an expandable shaft key embodying this invention and interconnecting a pulley and motor shaft;

FIG. 2 is a sectional view taken along section line 2—2 of FIG. 1;

FIG. 3 is an enlarged end view of the expandable key of FIG. 1;

FIG. 4 is an enlarged side elevational view of the expandable shaft key prior to its being locked in position between the shaft and the pulley; and FIG. 5 is an enlarged side elevational view of the shaft key corresponding to FIG. 4 showing the relative position of the parts after the shaft key is locked in position.

DETAILED DESCRIPTION OF THE PREFERRED EMBODIMENT

Referring now to the drawings, wherein the presently preferred embodiment of this invention is illustrated, FIG. 1 shows an expandable shaft key assembly 10 interconnecting a motor shaft 12 and the hub of a pulley 14.

The expandable shaft key 10 includes first and second key parts 16 and 18. The first key part 16 has an elongated construction with an enlarged end that has an axially extending threaded bore 20 therethrough. A pair of outwardly facing sloping surfaces 22 and 24 are provided on the first key part 16.

The second key part 18 is of similar elongated construction with an enlargement at one end. The enlarged end of the key part 18 has an axially extending bore 26 with internal screw threads. The key member 18 has inwardly facing sloping surfaces 28 and 30. The surfaces 22 and 24 of the inner key part 16 are adapted to be in sliding engagement with the surfaces 28 and 30 of the second key part 18.

An intermediate member 32 interconnects the key parts 16 and 18. The intermediate member 32 has a rod-like construction with screw threads 34 of coarse pitch at one end to engage the internal threads of the bore 20 in the first key part 16. The intermediate member 32 has screw threads 36 at its other end that are of fine pitch. These threads engage the bore 26 of the second key part 18.

The end of the intermediate member 32 is provided with a hexagonal socket 38 to receive an Allen wrench.

OPERATION

The shaft 12 is provided with a square cut key-way 40 and the internal surface of the bore of the hub of the pulley 14 is provided with a similar square cut keyway 42. The pulley 14 is placed upon the shaft 12 with the keyways 40 and 42 in alignment. The expandable shaft key assembly 10 is inserted into the opening defined by the keyways 40 and 42.

The expandable key 10 is originally assembled by threading the end 36 with the fine teeth into the bore 26 of the second key part 18. The intermediate member is then rotated to bring the coarse threads 34 into engagement with the threads of the bore 20 of the first key part 16. This action provides initial assembly of the expandable key 10 and permits its insertion into the opening defined by the aligned keyways 40 and 42.

When the expandable shaft key 10 is inserted into the aligned keyways 40 and 42, it has a configuration as seen in FIG. 4 with clearance being provided between the radially inwardly facing surface of the keyway 42 and the key part 18 and between the radially outwardly facing surface of the keyway 40 and the key part 16. This radial clearance permits the expandable shaft key 10 to be inserted fully into the opening provided by the two keyways 40 and 42.

Once the key 10 is placed in position, an Allen wrench is inserted into the hexagonal socket 38 and rotated. Due to the difference in the pitch angle of the threaded portions 34 and 36 of the intermediate member 32, relative axial movement will be produced between the first and second key parts 16 and 18 when the member 32 is turned.

The intermediate member 32 is rotated in a direction that will cause the enlarged ends of the two key parts 16 and 18 to be drawn together with the inclined surfaces 28 and 30 sliding on the inclined surfaces 22 and 24. Due to the inclination of these surfaces, axial movement between the key parts 16 and 18 will be accompanied by relative radial displacement.

As the key parts 16 and 18 are drawn together, the radial expansion of the key assembly 10 produced thereby will cause the first key part 16 to engge the radially outwardly facing surface of the keyway 40 and the second key part 18 to engage the radially inwardly facing surface of the keyway 42.

Due to the differential in pitch between the threaded portions 34 and 36 of the intermediate member 32, a substantial mechanical advantage is provided. Therefore, nominal torque upon the Allen wrench in the hexagonal socket 38 will produce a substantial expanding force in the key 10 to lock the hub of the pulley 14 to the shaft 12.

As seen in FIGS. 2 and 3, the first and second key parts 16 and 18 have a width that corresponds to the width of the keyways 40 and 42 to provide a minimum of circumferential clearance therebetween.

As the key parts 16 and 18 are drawn together and radially expanded, the threaded bore 20 will move from a position in radial alignment with the threaded bore 26 as seen in FIG. 4 to a position of misalignment as seen in FIG. 5. When the key assembly 10 is tightened to lock the hub of the pulley 14 to the shaft 12, a misalignment of the threaded bores 20 and 26 will cause the threaded ends 34 and 36 of the intermediate member 32 to be deflected. The resulting elastic deformation of the intermediate member 34 will produce a force which will lock the components of the expandable key 10 in position. The force will secure the components of the key assembly 10 against accidental disassembly that might otherwise result from normal machinery vibration.

The expandable key 10 can be removed by rotating the intermediate member 32 in the opposite direction. Due to the fact that the intermediate member 32 is bent as seen in FIG. 5, it is secured in position and a tool will be required to counterrotate it. The member 32 will not be inadvertently rotated by vibration.

In summary, the present invention provides an expandable shaft key of simple construction which may be inserted and expanded into position in the opening defined by aligned keyways in a shaft and a pulley hub. The expandable shaft key is constructed and arranged to produce a locking force that will prevent the accidental loosening of the components of the key.

The foregoing description presents the presently preferred embodiment of this invention. Modifications and alterations may occur to those skilled in the art that will come within the scope and spirit of the foregoing description and the following claims.

I claim:

1. An expandable key assembly constructed to interconnect first and second members having aligned keyways, said expandable key assembly having a generally rectangular cross section, said key assembly comprising a first key part, a second key part and an intermediate member interconnecting said parts, said first and second key parts each being of elongated construction nd having a sloping surface, said sloping surface of said first key part being in slidable engagement with said sloping surface of said second key part, said first and second key parts each having an enlarged end with a threaded axial bore, said intermediate member having a first threaded portion threadedly engaging the bore of said first key part and a second threaded portion threadedly engaging the bore of said second key part, said intermediate member being constructed to be rotated and to produce axial and of said first key part relative to said second key part and concomitant transverse radial displacement of said first key part relative to said second key part.

2. An expandable key assembly constructed to interconnect first and second members having aligned keyways, said expandable key assembly having a generally rectangular cross section, said key assembly comprising a first key part, a second key part and an intermediate member interconnecting said parts, said first and second key parts each being of elongated construction and having a sloping surface, said sloping surface of said first key part being in slidable engagement with said sloping surface of said second key part, said first and second key parts each having an enlarged end with a threaded axial bore, said intermediate member having a first threaded portion threadedly engaging the bore of said first key part and a second threaded portion threadedly engaging the bore of said second key part, said first threaded portion of said intermediate member having relatively coarse pitch screw threads, said second threaded portion of said intermediate member having relatively fine pitch screw threads, said intermediate member being constructed to be rotated and to produce axial displacement of said first key part relative to said second key part and concomitant transverse radial displacement of said first key part relative to said second key part.

3. An expandable key assembly constructed to interconnect first and second members having aligned keyways, said key assembly comprising a first key part, a second key part and an intermediate member interconnecting said parts, said first and second key parts each having a bore, said intermediate member having a first threaded portion threadedly engaging the bore of said first key part and a second portion engaging the bore of said second key part, said intermediate member being constructed to be rotated to produce axial displacement of said first key part relative to said second key part, means responsive to relative axial displacement of said first and second key parts constructed to produce relative transverse displacement between said key parts, said transverse displacement of said key parts causing deformation of said intermediate member whereby a force is produced that resists accidental displacement of said intermediate member.

4. An expandable key assembly according to claim 3 and including:

said first and second key parts each having an enlarged end with a threaded bore, second portion of said intermediate member being threaded and threadedly engaging the threaded bore of said second key part.

5. An expandable key assembly according to claim 4 and including:

said intermediate member having a tool receiving portion adapted to permit the use of a tool to cause the rotation of said intermediate member, said first threaded end of said intermediate member having relatively coarse pitch screw threads, said second threaded end of said intermediate member having relatively fine pitch screw threads.

6. An expandable key assembly constructed to interconnect first and second members having aligned keyways, said expandable key assembly of generally rectangular cross section, said key assembly comprising a first key part, a second key part and an intermediate member interconnecting said parts, said first and second key parts each being of elongated construction and having first and second sloping surfaces, said first and second key parts each having an enlarged end with a threaded bore, said first and second sloping surfaces of said first key part being in slidable engagement with said first and second sloping surfaces of said second key part, said intermediate member having a first threaded end threadedly engaging the bore of said first key part and a second threaded end threadedly engaging the bore of said second key part, said intermediate member having a tool receiving portion adapted to permit the use of a tool to cause the rotation of said intermediate member, said first threaded end of said intermediate member having relatively coarse pitch screw threads, said second threaded end of said intermediate member having relatively fine pitch screw threads, said intermediate member being constructed to be rotated whereby the differential in pitch between said first and second threaded ends of said intermediate member will produce axial displacement between said first and second key parts and concomitant transverse displacement of said first key part relative to said second key part and elastic deformation of said intermediate member, said elastic deformation of said intermediate member producing a force that resists accidental displacement of said intermediate member.

* * * * *

UNITED STATES PATENT OFFICE
CERTIFICATE OF CORRECTION

Patent No. 3,841,774     Dated October 15, 1974

Inventor(s) Joel W. Maxey

It is certified that error appears in the above-identified patent and that said Letters Patent are hereby corrected as shown below:

Column 4, line 25, change "nd" to -- and --;

line 35, change "and" (second occurrance) to -- displacement --.

Signed and sealed this 15th day of April 1975.

(SEAL)
Attest:

RUTH C. MASON
Attesting Officer

C. MARSHALL DANN
Commissioner of Patents
and Trademarks